US010956567B2

United States Patent
Ogawa et al.

(10) Patent No.: US 10,956,567 B2
(45) Date of Patent: *Mar. 23, 2021

(54) CONTROL DEVICE, INTEGRATED INDUSTRIAL SYSTEM, AND CONTROL METHOD THEREOF

(71) Applicant: YOKOGAWA ELECTRIC CORPORATION, Tokyo (JP)

(72) Inventors: Toshiki Ogawa, Tokyo (JP); Kazuya Suzuki, Tokyo (JP); Yasuhiko Yamashiro, Tokyo (JP); Sho Fujita, Tokyo (JP); Kenji Hasegawa, Tokyo (JP); Taro Kemmotsu, Tokyo (JP); Yuichiro Kadowaki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 15/373,638

(22) Filed: Dec. 9, 2016

(65) Prior Publication Data

US 2017/0169219 A1 Jun. 15, 2017

(30) Foreign Application Priority Data

Dec. 15, 2015 (JP) .............................. JP2015-244048

(51) Int. Cl.
*G06F 21/55* (2013.01)
*G05B 19/042* (2006.01)
(Continued)

(52) U.S. Cl.
CPC ....... *G06F 21/556* (2013.01); *G05B 19/0428* (2013.01); *G06F 21/552* (2013.01);
(Continued)

(58) Field of Classification Search
CPC ...... G06F 21/55; G06F 21/556; G06F 21/552; G06F 21/554; G06F 21/566;
(Continued)

(56) References Cited

U.S. PATENT DOCUMENTS 7,185,366 B2 * 2/2007 Mukai ................. H04L 63/1425
713/153
7,467,018 B1 * 12/2008 Callaghan ............. G06F 16/258
700/1
(Continued)

FOREIGN PATENT DOCUMENTS

DE 10 2005 063052 A1 7/2007
EP 2775685 A1 9/2014
(Continued)

OTHER PUBLICATIONS

Karnouskos et al., Architecting the next generation of service-based Scadaides system of systems, IEEE (Year: 2006).*
(Continued)

*Primary Examiner* — Noura Zoubair
*Assistant Examiner* — Mahabub S Ahmed
(74) *Attorney, Agent, or Firm* — Sughrue Mion, PLLC

(57) ABSTRACT

A control device of an integrated industrial system which is established in a plant, the control device includes a defender configured to perform a countermeasure of restricting at least a part of functions of a self-device, based on a detection result of a detector which detects a cyber-attack from at least one of inside and outside to the integrated industrial system.

19 Claims, 8 Drawing Sheets

(51) Int. Cl.
*G06Q 30/02* (2012.01)
*H04L 29/06* (2006.01)
(52) U.S. Cl.
CPC ... *G06Q 30/02* (2013.01); *G05B 2219/45103* (2013.01); *G06F 2221/034* (2013.01); *H04L 63/14* (2013.01)
(58) Field of Classification Search
CPC .. G06F 21/567; G06F 21/568; G06F 2221/03; G06F 2221/034; G05B 19/0428; G05B 2219/45103; G06Q 30/02; H04L 63/14; H04L 63/30
USPC .......................................................... 726/23
See application file for complete search history.

(56) References Cited

U.S. PATENT DOCUMENTS

| | | | | |
|---|---|---|---|---|
| 7,966,659 | B1* | 6/2011 | Wilkinson | H04L 63/0209 726/11 |
| 8,881,288 | B1* | 11/2014 | Levy | H04L 63/1408 726/25 |
| 9,009,084 | B2* | 4/2015 | Brandt | G05B 19/4185 706/12 |
| 9,648,029 | B2* | 5/2017 | Cheng | H04L 63/1416 |
| 9,836,990 | B2* | 12/2017 | Nguyen | H04L 63/1433 |
| 9,892,261 | B2* | 2/2018 | Joram | G06F 21/566 |
| 10,021,125 | B2* | 7/2018 | Talamanchi | H04L 63/1433 |
| 10,026,049 | B2* | 7/2018 | Asenjo | H04L 63/1433 |
| 10,078,317 | B2* | 9/2018 | Houmb | G05B 19/406 |
| 10,146,936 | B1* | 12/2018 | Khanduja | G06F 21/552 |
| 2003/0188197 | A1 | 10/2003 | Miyata et al. | |
| 2005/0005017 | A1* | 1/2005 | Ptacek | H04L 63/029 709/229 |
| 2005/0050346 | A1* | 3/2005 | Felactu | G06F 21/552 726/8 |
| 2005/0273184 | A1* | 12/2005 | Dauss | G06Q 10/10 700/26 |
| 2006/0026682 | A1* | 2/2006 | Zakas | H04L 29/06 726/22 |
| 2006/0031938 | A1* | 2/2006 | Choi | G06F 21/577 726/25 |
| 2006/0053491 | A1* | 3/2006 | Khuti | H04L 63/1416 726/23 |
| 2006/0294579 | A1* | 12/2006 | Khuti | H04L 63/20 726/3 |
| 2008/0016339 | A1* | 1/2008 | Shukla | G06F 21/566 713/164 |
| 2008/0125887 | A1* | 5/2008 | Case | G05B 23/0272 700/83 |
| 2008/0162085 | A1* | 7/2008 | Clayton | G05B 23/0262 702/188 |
| 2009/0089325 | A1* | 4/2009 | Bradford | G05B 19/4185 |
| 2010/0077471 | A1* | 3/2010 | Schleiss | G05B 19/0428 726/13 |
| 2010/0287608 | A1* | 11/2010 | Khuti | H04L 63/14 726/11 |
| 2011/0023088 | A1* | 1/2011 | Ko | H04L 63/102 726/3 |
| 2011/0067107 | A1* | 3/2011 | Weeks | H04L 63/1491 726/23 |
| 2011/0289588 | A1* | 11/2011 | Sahai | G06Q 90/00 726/25 |
| 2012/0151593 | A1* | 6/2012 | Kang | H04L 41/142 726/25 |
| 2012/0180133 | A1* | 7/2012 | Al-Harbi | H04L 63/1433 726/25 |
| 2012/0209411 | A1* | 8/2012 | Ohkado | G06F 21/552 700/80 |
| 2012/0284790 | A1* | 11/2012 | Bhargava | G06F 11/3612 726/22 |
| 2012/0313755 | A1 | 12/2012 | Gutierrez et al. | |
| 2013/0031037 | A1* | 1/2013 | Brandt | H04L 63/1416 706/12 |
| 2013/0081103 | A1* | 3/2013 | Uner | G06F 21/56 726/1 |
| 2013/0091539 | A1* | 4/2013 | Khurana | H04L 63/1425 726/1 |
| 2013/0201192 | A1* | 8/2013 | Kanda | G06T 11/206 345/440 |
| 2013/0211555 | A1* | 8/2013 | Lawson | H04L 67/16 700/28 |
| 2013/0211558 | A1* | 8/2013 | Mishina | G05B 19/058 700/79 |
| 2013/0212214 | A1* | 8/2013 | Lawson | H04L 67/306 709/217 |
| 2013/0212669 | A1* | 8/2013 | Wilson | H04L 63/1416 726/12 |
| 2013/0227689 | A1* | 8/2013 | Pietrowicz | G01R 1/20 726/23 |
| 2013/0245793 | A1* | 9/2013 | Akiyama | G05B 23/0262 700/79 |
| 2013/0274898 | A1* | 10/2013 | Thatikonda | G05B 23/0224 700/44 |
| 2013/0312092 | A1* | 11/2013 | Parker | H04L 63/1408 726/22 |
| 2014/0237599 | A1* | 8/2014 | Gertner | H04L 63/145 726/24 |
| 2014/0237606 | A1* | 8/2014 | Futoransky | G06F 21/577 726/25 |
| 2014/0283047 | A1* | 9/2014 | Dixit | G06F 21/55 726/23 |
| 2014/0317737 | A1* | 10/2014 | Shin | H04L 63/1408 726/23 |
| 2014/0337977 | A1* | 11/2014 | Ward | H04L 67/10 726/23 |
| 2015/0040228 | A1* | 2/2015 | Lee | H04L 41/0631 726/25 |
| 2015/0244734 | A1* | 8/2015 | Olson | G06F 21/577 726/25 |
| 2015/0281278 | A1* | 10/2015 | Gooding | H04L 63/20 726/1 |
| 2015/0295944 | A1 | 10/2015 | Yunoki et al. | |
| 2015/0301515 | A1* | 10/2015 | Houmb | G06F 21/552 700/108 |
| 2015/0381642 | A1* | 12/2015 | Kim | H04L 69/329 726/23 |
| 2015/0381649 | A1* | 12/2015 | Schultz | H04L 63/1433 726/23 |
| 2016/0036838 | A1* | 2/2016 | Jain | H04L 63/1416 726/23 |
| 2016/0050225 | A1* | 2/2016 | Carpenter | H04L 63/1416 726/25 |
| 2016/0078694 | A1* | 3/2016 | Swift | G05B 15/02 701/34.2 |
| 2016/0094578 | A1* | 3/2016 | McQuillan | H04L 63/1416 726/23 |
| 2016/0112443 | A1* | 4/2016 | Grossman | H04L 63/1425 726/23 |
| 2016/0112445 | A1* | 4/2016 | Abramowitz | G06Q 40/08 726/23 |
| 2016/0234241 | A1* | 8/2016 | Talamanchi | H04L 41/0803 |
| 2016/0261482 | A1* | 9/2016 | Mixer | H04L 43/04 |
| 2016/0330225 | A1* | 11/2016 | Kroyzer | G06N 20/00 |
| 2016/0337390 | A1* | 11/2016 | Sridhara | G06F 3/0484 |
| 2016/0344754 | A1* | 11/2016 | Rayapeta | H04L 63/1416 |
| 2016/0366174 | A1* | 12/2016 | Chernin | H04L 63/04 |
| 2017/0126727 | A1* | 5/2017 | Beam | H04L 63/1433 |
| 2017/0353484 | A1 | 12/2017 | Knapp et al. | |
| 2018/0020014 | A1* | 1/2018 | Kamiya | G06F 21/56 |
| 2018/0063244 | A1* | 3/2018 | Maturana | G06F 9/548 |
| 2018/0096153 | A1* | 4/2018 | Dewitte | G06F 21/552 |

FOREIGN PATENT DOCUMENTS

| | | |
|---|---|---|
| JP | 2000-267957 A | 9/2000 |
| JP | 2003-288282 A | 10/2003 |
| JP | 2010-081610 A | 4/2010 |

(56) References Cited

FOREIGN PATENT DOCUMENTS

| JP | 2013-161432 A | 8/2013 | | |
|---|---|---|---|---|
| WO | 2015/001594 A1 | 1/2015 | | |
| WO | WO-2015092817 A1 | * | 6/2015 | ......... H04L 63/1416 |
| WO | 2015/104691 A2 | 7/2015 | | |

OTHER PUBLICATIONS

Schuster et al., A Distributed Intrusion Detection System for Industrial Automation Networks, IEEE (Year: 2012).*

Briesemeister et al., Detection, Correlation, and Visualization of Attacks Against Critical Infrastructure Systems, IEEE (Year: 2010).*

Jiang et al., A Zone-Based Intrusion Detection System for Wireless Ad Hoc Distribution Power Communication Networks, IEEE (Year: 2005).*

McLaughlin et al., Multiattribute SCADA-Specific Intrusion Detection System for Power Networks, IEEE (Year: 2014).*

Zhu et al., SCADA-specific Intrusion Detection/Prevention Systems: A Survey and Taxonomy, University of California at Berkeley, Berkeley, CA (Year: 2010).*

Cheung et al, Using Model-based Intrusion Detection for SCADA Networks, SRI International (Year: 2006).*

An Office Action dated Dec. 31, 2018, which issued during the prosecution of U.S. Appl. No. 15/373,601.

Akira Wakabayashi, "Safety Instrumented System for Process Industry", Japan Industrial Publishing Co., Ltd., Oct. 1, 2013, vol. 41, pp. 46-51 (8 pages total).

Masashi Murakami, "To Build a Control System that is Strong against Cyber Attacks", Instrumentation Control Engineering, Japan, Kogyogijutsusha, Feb. 18, 2013, vol. 56, pp. 63-71 (13 pages total).

Shoichi Doi, "The Optimal Security Design for a Production Control System", Masahiro Miyauchi, Japan Technical Association of the Pulp and Paper Industry, Feb. 27, 2015, vol. 69, pp. 43-48 (9 pages total).

* cited by examiner

| ATTACK TARGET No. | COUNTERMEASURE No. | TARGET DEVICE |
|---|---|---|
| A1 | B1 | — |
| A2 | B1 | — |
| A3 | B1 | — |
| A4 | B1 | — |
| A5 | B2&B4 | ENG23, CNT31a, 31b |
| A6 | B2&B4 | ENG23, CNT31a, 31b |
| A7 | B2&B4 | ENG23, CNT31a, 31b |
| A8 | B3&B5 | ENG23, CNT31a, 31b |
| A9 | B6 | ENG23, CNT31a, 31b |
| A10 | B3&B5 | ENG23, CNT31a, 31b |
| A11 | B3&B5 | ENG23, CNT31a, 31b |
| A12 | B3&B5 | ENG23, CNT31a, 31b |

FIG. 4A

| ATTACK TARGET No. | ZONE | DEVICE | LEVEL | TYPE |
|---|---|---|---|---|
| A1 | Z3 | FIREWALL | NETWORK | ALL ALARMS |
| A2 | Z3 | FIREWALL | NETWORK | ALL ALARMS |
| A3 | Z3 | SWITCH | NETWORK | ALL ALARMS |
| A4 | Z3 | PC | ALL | VIRUS WORM |
| A5 | Z2 | FIREWALL SWITCH | NETWORK | ALL WARNINGS ALL ALARMS |
| A6 | Z2 | SWITCH | NETWORK | ALL WARNINGS ALL ALARMS |
| A7 | Z2 | PC CONTROLLER | ALL | ALL WARNINGS ALL ALARMS |
| A8 | Z1 | HMI22 | ALL | ALL WARNINGS ALL ALARMS |
| A9 | Z1 | ENG23 | ALL | ALL WARNINGS ALL ALARMS |
| A10 | Z1 | CNT31a | ALL | ALL WARNINGS ALL ALARMS |
| A11 | Z1 | CNT31b | ALL | ALL WARNINGS ALL ALARMS |
| A12 | Z1 | OPERATION CONTROLLER | ALL | ALL WARNINGS ALL ALARMS |

FIG. 4B

| COUNTERMEASURE No. | ACTION |
|---|---|
| B1 | RECORD IN EVENT LOG, AND NOTIFY SYSTEM ADMINISTRATOR |
| B2 | RESTRICT FROM CHANGING APPLICATION (DUAL PASSWORD) |
| B3 | PROHIBIT FROM CHANGING APPLICATION |
| B4 | RESTRICT FROM EXECUTING CONTROL COMMAND FROM OUTSIDE (DISPLAY CONFIRMATION DIALOG) |
| B5 | DISCARD CONTROL COMMAND FROM OUTSIDE |
| B6 | STOP ALL COMMUNICATION FUNCTIONS |
| B7 | SHUT DOWN PLANT |

FIG. 5

| ATTACK TARGET No. | COUNTERMEASURE No. | TARGET DEVICE |
|---|---|---|
| A21 | B21 | — |
| A22 | B21 | — |
| A23 | B22 | ENG23, CNT31a, 31b |
| A24 | B23 | ENG23, CNT31a, 31b |

| ATTACK TARGET No. | ZONE | DEVICE | LEVEL | TYPE |
|---|---|---|---|---|
| A21 | Z3 | ALL | ALL | ALL ALARMS |
| A22 | Z2 | ALL | ALL | ALL ALARMS |
| A23 | Z1 | HMI22, CNT31a, 31b | ALL | ALL ALARMS |
| A24 | Z1 | ENG23 | ALL | ALL ALARMS |

FIG. 6B

| COUNTERMEASURE No. | ACTION |
|---|---|
| B21 | RECORD IN EVENT LOG, AND DISPLAY ON MANAGEMENT SCREEN OF SYSTEM ADMINISTRATOR |
| B22 | RESTRICT FROM CHANGING APPLICATION (DUAL PASSWORD) |
| B23 | RESTRICT FROM EXECUTING CONTROL COMMAND FROM OUTSIDE (DISPLAY CONFIRMATION DIALOG) |

CONTROL DEVICE, INTEGRATED INDUSTRIAL SYSTEM, AND CONTROL METHOD THEREOF

BACKGROUND

Technical Fields

The disclosure relates to a control device, an integrated industrial system, and a control method thereof.

Priority is claimed on Japanese Patent Application No. 2015-244048, filed Dec. 15, 2015, the contents of which are incorporated herein by reference.

Related Art

In a plant and a factory (hereinafter, called simply "plant" as a generic name of them), an integrated industrial system is established, and an advanced automatic operation is implemented. In order to secure safety and perform advanced control, the integrated industrial system includes a control system such as a distributed control system (DCS) and a safety system such as a safety instrumented system (SIS). The distributed control system is a process control system which controls industrial process implemented in the plant.

In the distributed control system, field devices (for example, a measurement device and an actuation device) and a controller which controls these field devices are connected to each other through communication means. The controller collects measurement data measured by a field device, and operates (controls) a field device in accordance with the collected measurement data. Thereby, the distributed control system controls various kinds of state quantity in the industrial process. In an emergency, the safety instrumented system certainly shuts down the plant in a safe state. Thereby, the safety instrumented system prevents a physical injury and an environmental pollution, and protects expensive facilities. When an abnormal circumstance occurs in the plant, the safety instrumented system plays a role of "stronghold for securing safety".

There is a possibility that the integrated industrial system receives cyber-attacks from outside. For this reason, in the integrated industrial system, countermeasures (security countermeasures) for a case that each of the distributed control system and the safety instrumented system receives cyber-attacks, or for a case that the whole integrated industrial system receives cyber-attacks, are prepared. For example, a firewall for preventing intrusion from outside to the integrated industrial system is prepared, or antivirus software (software which detects virus infection and removes virus) is installed in a computer. The controller which is a core of the distributed control system and the safety instrumented system has a high resistance against cyber-attacks by using an original operating system.

The integrated industrial system is sectioned into two or more zones, and the security countermeasures are basically applied to each zone. For example, an integrated industrial system established in conformity with hierarchical structures specified by International Standard ISA-95 (IEC/ISO 62264) is sectioned into two or more zones on the basis of hierarchy. The security countermeasures are applied to each hierarchy. For example, a conventional technology for maintaining security of a control network is disclosed in Japanese Unexamined Patent Application Publication No. 2000-267957 and Japanese Unexamined Patent Application Publication No. 2010-081610. A conventional technology for displaying a tree view in accordance with hierarchical structure of International Standard ISA-95 is disclosed in Japanese Unexamined Patent Application Publication No. 2013-161432.

By the way, as described above, since the security countermeasures against cyber-attacks from the outside are basically applied to each zone, the security countermeasures are individually performed in each zone when cyber-attacks are performed. For this reason, in the conventional integrated industrial system, if the security countermeasures of each zone are not enough with respect to cyber-attacks, the cyber-attacks reach the zone where the safety instrumented system belongs. For this reason, there is a problem that final defense countermeasures depend on security countermeasures applied to the zone where the safety instrumented system belongs.

The safety instrumented system does not usually communicate with a host system, but the safety instrumented system communicates with the distributed control system. On the other hand, the distributed control system is supposed to communicate with the host system. As a result, since the safety instrumented system is connected to the host system, there is a problem that cyber-attacks may reach the zone where the safety instrumented system belongs.

As described above, if the security countermeasures of each zone are not enough with respect to cyber-attacks, cyber-attacks reach the zone where the safety instrumented system belongs. For this reason, a control right of the safety instrumented system (or an engineering station which creates program to be used by the safety instrumented system) may be deprived. If cyber-attacks are performed from inside the integrated industrial system (for example, if a device which has been infected with a virus is arranged in the integrated industrial system), a situation in which the control right of the safety instrumented system may be also deprived. If such a situation occurs and programs of the controller which is a core of the safety instrumented system are rewritten, a role of "stronghold for securing safety" is lost. Therefore, it is necessary not to raise the above-described situation.

SUMMARY

A control device of an integrated industrial system which is established in a plant, the control device may include a defender configured to perform a countermeasure of restricting at least a part of functions of a self-device, based on a detection result of a detector which detects a cyber-attack from at least one of inside and outside to the integrated industrial system.

Further features and aspects of the present disclosure will become apparent from the following detailed description of exemplary embodiments with reference to the attached drawings.

BRIEF DESCRIPTION OF THE DRAWINGS

FIG. 4A is a drawing illustrating an example of the attack target list in the first embodiment of the present invention.

FIG. 4B is a drawing illustrating an example of the countermeasure list in the first embodiment of the present invention.

FIG. 5 is a drawing illustrating another example of the setting list in the first embodiment of the present invention.

FIG. 6A is a drawing illustrating another example of the attack target list in the first embodiment of the present invention.

FIG. 6B is a drawing illustrating another example of the countermeasure list in the first embodiment of the present invention.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a control device, an integrated industrial system, and a control method thereof which can defend against cyber-attacks from at least one of inside and outside to a safety instrumented system beforehand, and can secure a normality of the safety instrumented system.

Hereinafter, a control device, an integrated industrial system, and a control method thereof of embodiments will be described in detail, with reference to drawings.

First Embodiment

<Integrated Industrial System>

Figure 1:
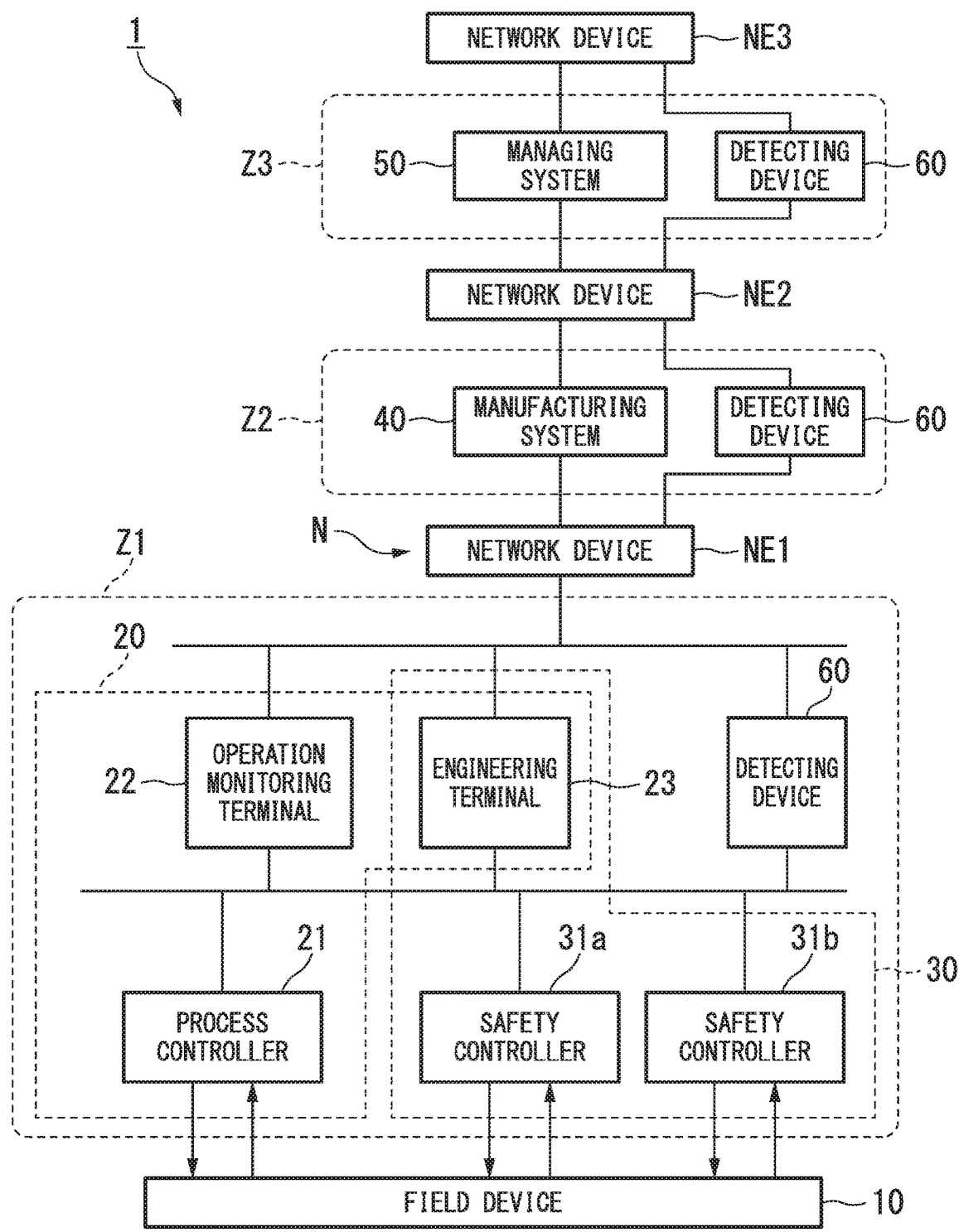
FIG. 1 is a block diagram illustrating a whole configuration of the integrated industrial system in the first embodiment of the present invention.

FIG. 1 is a block diagram illustrating a whole configuration of the integrated industrial system in the first embodiment of the present invention. As shown in FIG. 1, the integrated industrial system 1 of the present embodiment includes a field device 10, a distributed control system (DCS) 20, a safety instrumented system (SIS) 30, a manufacturing system 40, a managing system 50, and a detecting device 60 (detector). The integrated industrial system 1 performs automatic operation of a plant, and performs maintenance management of the plant.

The integrated industrial system 1 is established in conformity with hierarchical structures specified by International Standard ISA-95 (IEC/ISO 62264). Specifically, in the integrated industrial system 1, the distributed control system 20 and the safety instrumented system 30 belong to a hierarchy of level 2, the manufacturing system 40 belongs to a hierarchy of level 3, and the managing system 50 belongs to a hierarchy of level 4. The distributed control system 20, the safety instrumented system 30, the manufacturing system 40, the managing system 50, and the detecting device 60 are connected to each other through a network N configured by network devices NE1 to NE3.

The integrated industrial system 1 is sectioned into two or more zones on the basis of hierarchy in order to prepare security countermeasures. Specifically, in the integrated industrial system 1, the distributed control system 20 and the safety instrumented system 30 are installed in a zone Z1, the manufacturing system 40 is installed in a zone Z2, and the managing system 50 is installed in a zone Z3.

The plant includes an industrial plant such as a chemical industrial plant, a plant managing and controlling a wellhead (for example, a gas field and an oil field), a plant managing and controlling a generation of electric power (for example, hydro power, thermal power, and nuclear power), a plant managing and controlling a power harvesting (for example, solar power and wind power), a plant managing and controlling water supply and sewerage systems, a dam, and so on.

The field device 10 is installed at a field of the plant, and the field device performs measurement and actuation required for control of industrial process under control of the distributed control system 20. Specifically, the field device 10 is such as a sensor device (for example, a pressure meter, a flowmeter, a temperature sensor, a gas sensor, and a vibration sensor), a valve device (for example, a flow control valve and an on-off valve), an actuator device (for example, a fan and a motor), an imaging device (for example, a camera and a video camera recording circumstances and objects in the plant), a sound device (for example, a microphone collecting abnormal noise in the plant, and a speaker generating alarm sound), a position detection device outputting position information of the each device, and other devices.

The field device 10 communicates with the distributed control system 20 or the safety instrumented system 30. For example, the field device 10 performs wired communication through a network or a communication bus (not shown), or wireless communication in conformity with industrial wireless communication standards, such as ISA100.11a and WirelessHART (registered trademark), with respect to the distributed control system 20 and the safety instrumented system 30.

The distributed control system 20 is equipped with a process controller 21, an operation monitoring terminal 22, and an engineering terminal 23. The distributed control system 20 collects measurement data measured by the field device 10, and operates (controls) the field device 10 in accordance with the collected measurement data, in order to control various kinds of state quantity. The state quantity controlled by the distributed control system 20 is various kinds of state quantity in the industrial process. For example, the state quantity is pressure, temperature, flow quantity, or the like.

The process controller 21 is a core of the distributed control system 20. The process controller 21 collects the measurement data from the field device 10, and operates (controls) the field device 10. For example, the operation monitoring terminal 22 is operated by a plant operator, and the operation monitoring terminal 22 is used for monitoring an operational status of the plant. The engineering terminal 23 is a terminal used for creating programs to be executed by the process controller 21 and the operation monitoring terminal 22. The engineering terminal 23 does not need to be always connected to the network. The engineering terminal 23 is used by the distributed control system 20 and the safety instrumented system 30.

The safety instrumented system 30 is equipped with safety controllers 31a and 31b (control device), and an engineering terminal 23. In an emergency, the safety instrumented system 30 certainly shuts down the plant in a safe state, in order to prevent a physical injury and an environmental pollution, and protect expensive facilities. When an abnormal circumstance occurs in the plant, the safety instrumented system plays a role of "stronghold for securing safety".

Each of the safety controllers 31a and 31b is a core of the safety instrumented system 30. The safety controllers 31a and 31b communicate with the field device 10 or another safety controller (not shown) and obtains necessary data, in order to determine whether an abnormal circumstance occurs in the plant or not. If each of the safety controllers 31a and 31b determines that an abnormal circumstance occurs in the plant, each of the safety controllers 31a and 31b executes safety control logic for implementing a safety control. The engineering terminal 23 is also a terminal used for creating programs to be executed by the safety controllers 31a and 31b.

In the present embodiment, the engineering terminal 23 is used by the distributed control system 20 and the safety instrumented system 30, but a dedicated terminal corresponding to the engineering terminal 23 may be prepared in each of the distributed control system 20 and the safety instrumented system 30. In the present embodiment, an example in which the two safety controllers 31a and 31b are prepared in the safety instrumented system 30 will be described. However, a number of the safety controllers prepared in the safety instrumented system 30 may be one, and may be three or more. Details of the safety controllers 31a and 31b will be described later.

The manufacturing system 40 is a system established for manufacturing products in the plant efficiently. The manufacturing system 40 is such as a Manufacturing Execution System (MES), a Plant Information Management System (PIMS), and a Plant Asset Management System (PAM). As the manufacturing system 40, only one of the Manufacturing Execution System, the Plant Information Management System, and the Plant Asset Management System may be established, and two or more of them may be established.

The managing system 50 is a system established for business, such as management or sales and marketing in a company. For example, the managing system 50 is an Enterprise Resource Planning System (ERP).

The operation monitoring terminal 22, the engineering terminal 23, and the detecting device 60, which are installed in the zone Z1, are connected to the manufacturing system 40, which is installed in the zone Z2, via the network device NE1. The manufacturing system 40 installed in the zone Z2 is connected to the managing system 50, which is installed in the zone Z3, via the network device NE2. The managing system 50 installed in the zone Z3 is connected to another unillustrated network (for example, Internet) via the network device NE3.

That is, the network device NE1 is installed between the zone Z1 and the zone Z2. The network device NE2 is installed between the zone Z2 and the zone Z3. The network device NE3 is installed between the zone Z3 and the other unillustrated network (for example, Internet). The network devices NE1 to NE3 are such as a firewall, a router, a switch, and so on.

The detecting device 60 is installed in each of the zones Z1 to Z3. The detecting device 60 detects cyber-attacks from at least one of inside and outside to the self-zone. The cyber-attacks from outside to the self-zone are such as an unauthorized invasion to the integrated industrial system 1, an alteration of the program used by the integrated industrial system 1, a fraud and a destruction of data used by the integrated industrial system 1, an act for making the integrated industrial system 1 be in malfunction state, and other acts. The cyber-attacks from inside to the self-zone are such as an alteration of the program by using a USB (Universal Serial Bus) device which has been infected with a virus.

The detecting device 60 is prepared in accordance with a design concept of each of the zones Z1 to Z3. For example, the detecting device 60 can utilize commercial antivirus software (software which detects virus infection and removes virus), or utilize an intrusion detection system. In the present embodiment, in order to understand easily, an example that the detecting device 60 is prepared as "device" will be described, but the function of the detecting device 60 may be implemented by software.

The detecting device 60 installed in each of the zones Z1 to Z3 is connected to the network N. If the detecting device 60 installed in each of the zones Z1 to Z3 detects cyber-attacks, the detecting device 60 transmits the detection result to the safety controllers 31a and 31b through the network N. In the present embodiment, in order to explain easily, the detection result of the detecting device 60 is transmitted to the safety controllers 31a and 31b. However, the detection result of the detecting device 60 may be transmitted to the process controller 21, in addition to the safety controllers 31a and 31b.

<Control Device>

Figure 2:
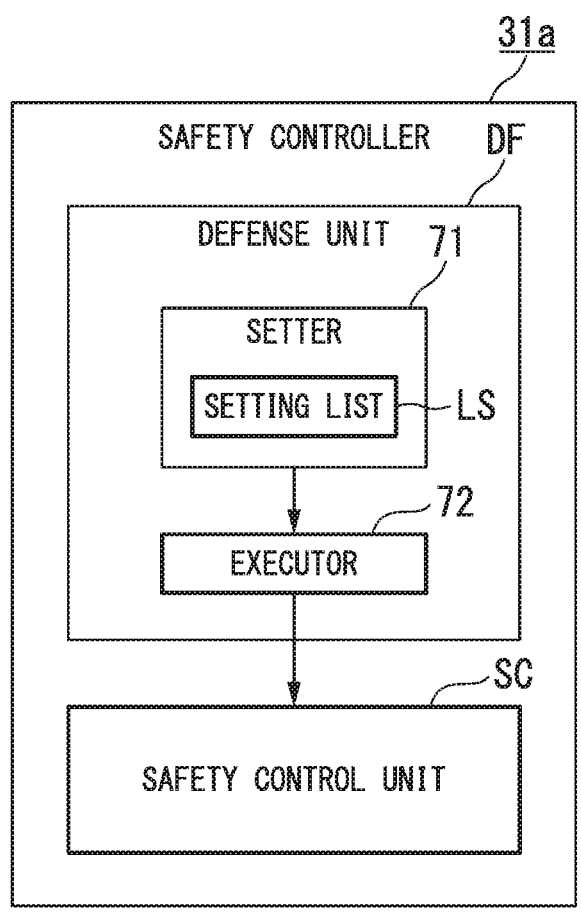
FIG. 2 is a block diagram illustrating a main configuration of the control device in the first embodiment of the present invention.

FIG. 2 is a block diagram illustrating a main configuration of the control device in the first embodiment of the present invention. In the present embodiment, the safety controllers 31a and 31b used as the control device have the same configuration. For this reason, the safety controller 31a will be described below, and an explanation of the safety controller 31b will be omitted.

As shown in FIG. 2, the safety controller 31a is equipped with a safety control unit SC and a defense unit DF (defender). The safety control unit SC implements an original function of the safety controller 31a. The safety control unit SC communicates with an external device (for example, the field device 10, the safety controller 31b, or the like), and the safety control unit SC executes a safety control logic for implementing safety control if an abnormality occurs in the plant.

The defense unit DF is equipped with a setter 71 and an executer 72. The defense unit DF performs security countermeasures for defending against cyber-attacks from at least one of outside and inside, based on the detection result obtained from the detecting device 60. Specifically, the defense unit DF controls the safety control unit SC to restrict a part of or all of the functions of the safety controller 31a. For example, the defense unit DF restricts a change of application programs used by the safety controller 31a, and restricts an execution of a control command input from outside.

The setter 71 specifies a target and a type of the cyber-attack based on the detection result of the detecting device 60, and the setter 71 sets security countermeasures in accordance with the specified contents. The setter 71 sets the security countermeasures by using a setting list LS in which an attack target list and a countermeasure list are associated with each other. The attack target list represents a list of the target and the type of the cyber-attack. The countermeasure list represents a list of security countermeasures which should be performed in accordance with the target and the type of the cyber-attack. The executor 72 executes security countermeasures which have been set by the setter 71. The function of the defense unit DF may be implemented by hardware, or may be implemented by software.

Figure 3:
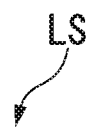
FIG. 3 is a drawing illustrating an example of the setting list in the first embodiment of the present invention.

FIG. 3 is a drawing illustrating an example of the setting list in the first embodiment of the present invention. FIG. 4A is a drawing illustrating an attack target list. FIG. 4B is a drawing illustrating a countermeasure list. As shown in FIG. 3, FIG. 4A, and FIG. 4B, the setting list LS is a list in which "attack target number" (attack target No.) of the attack target list, "countermeasure number" (countermeasure No.) of the countermeasure list, and "target device" have been associated with each other. The "target device" is a target to which security countermeasures are to be performed.

As shown in FIG. 4A, the attack target list is a list in which "attack target number" (attack target No.), "zone", "device", "level", and "type" have been associated with each other. The attack target list is a list used for specifying what kind of attack has been made with respect to which zone. The "attack target number" is a number allocated for distinguishing various cyber-attacks performed to the integrated industrial system 1. The "zone" is information for specifying a zone to which the cyber-attack has been performed.

The "device" is information for specifying a device to which the cyber-attack has been performed. The "device" is such as a personal computer (PC), a controller, a switch, a router, a firewall, and so on. The "level" is information for specifying which part of a device has been attacked with the cyber-attack. The "level" is such as an operating system (OS), a network, hardware, application, and so on. The "type" is information for specifying a type of the cyber-attack. The "type" is such as a virus, a DoS attack (Denial of Service attack), and so on.

As shown in FIG. 4B, a countermeasure list is a list in which "countermeasure number" (countermeasure No.) and "action" have been associated with each other. The "countermeasure number" is a number allocated for distinguishing various security countermeasures performed by the integrated industrial system 1. The "action" is information for specifying a security countermeasure which should be performed against the cyber-attack if the cyber-attack is performed. The "action" is such as restricting a change of application programs used by the safety controllers 31*a* and 31*b*, prohibiting the change of the application program, restricting an execution of a control command which has been input from outside, discarding the control command, stopping all communication functions, shutting down the plant, and so on.

For example, in a first line to a fourth line of the setting list LS shown in FIG. 3, each of attack target numbers "A1" to "A4" is associated with a countermeasure number "B1", and not associated with a target device. Since the association has been made, if a device (firewall, switch, or PC) which belongs to the zone Z3 has been received a cyber-attack, in the safety controllers 31*a* and 31*b*, recording in an event log and notifying a system administrator are to be performed, and a countermeasure of restricting a part of or all of functions is not to be performed.

For example, in a fifth line to a seventh line of the setting list LS shown in FIG. 3, each of attack target numbers "A5" to "A7" is associated with countermeasure numbers "B2&B4", and associated with target devices "ENG23, CNT31*a*, 31*b*". Since the association has been made, if a device (firewall, switch, PC, or controller) which belongs to the zone Z2 has been received a cyber-attack, in the engineering terminal (ENG) 23 and the safety controllers (CNT) 31*a* and 31*b*, countermeasures of restricting a change of application programs and restricting an execution of a control command input from outside are to be performed.

For example, in an eighth line and a tenth line to a twelfth line of the setting list LS shown in FIG. 3, each of attack target numbers "A8" and "A10" to "A12" is associated with countermeasure numbers "B3&B5", and associated with target devices "ENG23, CNT31*a*, 31*b*". Since the association has been made, if the operation monitoring terminal (HMI) 22, the safety controllers (CNT) 31*a* and 31*b*, and the process controller 21 which belong to the zone Z1 have been received a cyber-attack, in the engineering terminal (ENG) 23 and the safety controllers (CNT) 31*a* and 31*b*, countermeasures of prohibiting a change of application programs and discarding a control command input from outside are to be performed.

For example, in an ninth line of the setting list LS shown in FIG. 3, the attack target number "A9" is associated with a countermeasure number "B6", and associated with target devices "ENG23, CNT31*a*. 31*b*". Since the association has been made, if the engineering terminal (ENG) 23 which belongs to the zone Z1 has been received a cyber-attack, in the engineering terminal (ENG) 23 and the safety controllers (CNT) 31*a* and 31 *b*, a countermeasure of stopping all communication functions is to be performed.

FIG. 5 is a drawing illustrating another example of the setting list in the first embodiment of the present invention. FIG. 6A is a drawing illustrating another example of the attack target list. FIG. 6B is a drawing illustrating another example of the countermeasure list. The setting list LS shown in FIG. 5, the attack target list shown in FIG. 6A, and the countermeasure list shown in FIG. 6B are simplified in comparison with the lists shown in FIG. 3, FIG. 4A, and FIG. 4B. If a cyber-attack is detected, the setting list LS shown in FIG. 5, the attack target list shown in FIG. 6A, and the countermeasure list shown in FIG. 6B are used by an administrator in order to determine a countermeasure against the cyber-attack.

For example, in a first line and a second line of the setting list LS shown in FIG. 5, each of attack target numbers "A21" and "A21" is associated with a countermeasure number "B21", and not associated with a target device. Since the association has been made, if an any device which belongs to the zone Z2 or Z3 has been received a cyber-attack, in the safety controllers 31*a* and 31*b*, recording in an event log and notifying a system administrator are to be performed, and a countermeasure of restricting a part of or all of functions is not to be performed.

For example, in a third line of the setting list LS shown in FIG. 5, the attack target number "A23" is associated with a countermeasure number "B22", and associated with target devices "ENG23, CNT31*a*, 31*b*". Since the association has been made, if the operation monitoring terminal (HMI) 22 and the safety controllers (CNT) 31*a* and 31*b* which belong to the zone Z1 have been received a cyber-attack, in the engineering terminal (ENG) 23 and the safety controllers (CNT) 31*a* and 31*b*, a countermeasure of restricting a change of application programs is to be performed.

For example, in a fourth line of the setting list LS shown in FIG. 5, the attack target number "A24" is associated with a countermeasure number "B23", and associated with target devices "ENG23, CNT31*a*, 31*b*". Since the association has been made, if the engineering terminal (ENG) 23 which belongs to the zone Z1 has been received a cyber-attack, in the engineering terminal (ENG) 23 and the safety controllers (CNT) 31*a* and 31*b*, countermeasures of restricting a change of application programs and restricting an execution of a control command input from outside are to be performed.

Figure 7:
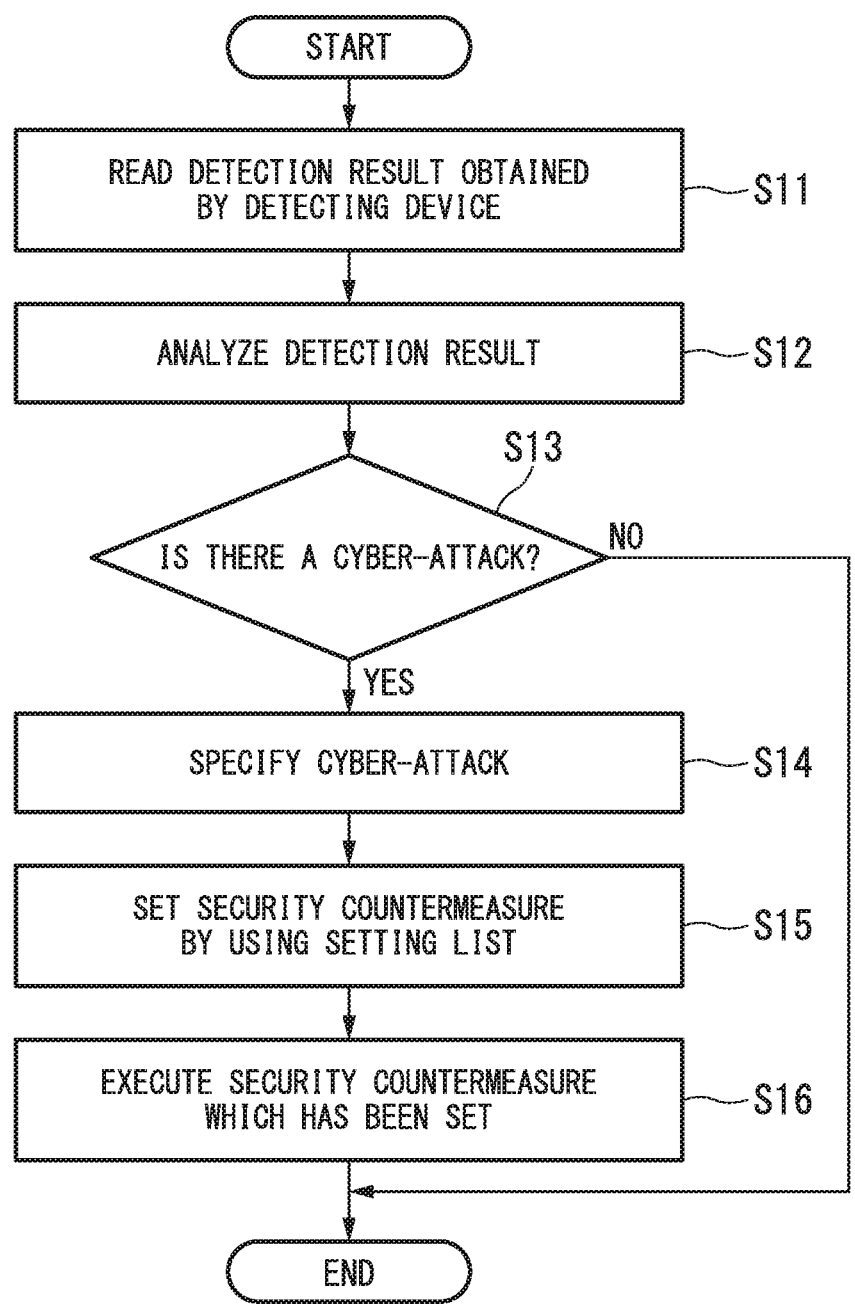
FIG. 7 is a flow chart illustrating an operation of the defense unit in the safety controller as the control device in the first embodiment of the present invention.

Next, operations of the integrated industrial system 1 of the above-described configuration will be described. Although operations of the integrated industrial system 1 are various, operations mainly performed by the detecting device 60 and the safety controllers 31*a* and 31*b* (operations for detecting a cyber-attack and defending against it) will be described below. FIG. 7 is a flow chart illustrating an operation of the defense unit in the safety controller as the control device in the first embodiment of the present invention. For example, processing of the flow chart shown in FIG. 7 is performed at a predetermined constant cycle.

If processing of the flow chart shown in FIG. 7 is started, first, the setter 71 (refer to FIG. 2) of the defense unit DF installed in the safety controllers 31*a* and 31 *b* reads the detection result obtained from the detecting device 60 (Step S11), and the setter 71 analyzes the detection result (Step S12). Next, the setter 71 determines whether or not there is a cyber-attack to the integrated industrial system 1 based on a result of the analysis (Step S13). If the setter 71 has determined that there is no cyber-attack to the integrated industrial system 1 (Step S13: "NO"), the series of processing shown in FIG. 7 ends.

On the other hand, if the setter 71 has determined that there is a cyber-attack to the integrated industrial system 1 (Step S13: "YES"), the setter 71 specifies a target and a type of the cyber-attack based on the result of the analysis performed at Step S12 (Step S14). If the setter 71 has specified a target and a type of the cyber-attack, the setter 71 sets a security countermeasure in accordance with the specified contents by using the setting list LS (Step S15). If the security countermeasure has been set by the setter 71, the setter 71 outputs, to the executor 72, information which represents the security countermeasure which has been set. The executor 72 executes the security countermeasure which has been set by the setter 71 (Step S16).

For example, a cyber-attack is performed to a PC used by the managing system 50 which belongs to the zone Z3, and the PC is infected with a virus. In this case, the virus infection of the PC is detected by the detecting device 60 which belongs to the zone Z3. The setter 71 of the defense unit DF installed in the safety controllers 31*a* and 31*b* reads this detection result (Step S11), and the setter 71 analyzes it (Step S12). Then, the determination result of Step S13 shown in FIG. 7 is "YES". For this reason, in Step S14, the setter 71 specifies that the PC which belongs to the zone Z3 has been infected with a virus by the cyber-attack (attack target number "A4").

If the target and the type of the cyber-attack have been specified, the setter 71 of the defense unit DF installed in the safety controllers 31*a* and 31*b* sets a security countermeasure of recording in the event log and notifying the system administrator, based on the countermeasure number "B1" associated with the attack target number "A4" of the fourth line of the setting list LS shown in FIG. 3 (Step S15). Thereafter, the executor 72 executes the security countermeasure which has been set by the setter 71, and recording in the event log and notifying the system administrator are performed (Step S16).

For example, a cyber-attack is performed to the engineering terminal 23 which belongs to the zone Z1. In this case, the cyber-attack to the engineering terminal 23 is detected by the detecting device 60 which belongs to the zone Z1. The setter 71 of the defense unit DF installed in the safety controllers 31*a* and 31*b* reads this detection result (Step S11), and the setter 71 analyzes it (Step S12). Then, the determination result of Step S13 shown in FIG. 7 is "YES". For this reason, in Step S14, the setter 71 specifies that the engineering terminal 23 which belongs to the zone Z1 has been received the cyber-attack (attack target number "A9").

If the target and the type of the cyber-attack have been specified, the setter 71 sets a security countermeasure of stopping all communication functions of the engineering terminal 23 and the safety controllers 31*a* and 31*b*, based on the countermeasure number "B6" and the target device "ENG 23, CNT31*a*, 31*b*" which are associated with the attack target number "A9" of the ninth line of the setting list LS shown in FIG. 3 (Step S15). Thereafter, the executor 72 executes the security countermeasure which has been set by the setter 71 of the defense unit DF installed in the safety controllers 31*a* and 31*b*, all the communication functions of the engineering terminal 23 and the safety controllers 31*a* and 31*b* are stopped (Step S16).

By performing the above-described processing, for example, even if the engineering terminal 23 is infected with a virus by using a USB device which has been infected with a virus, all the communication functions of the engineering terminal 23 and the safety controllers 31*a* and 31*b* are stopped. Thereby, the cyber-attack to the safety controllers 31*a* and 31*b* can be prevented beforehand, and the normality of the safety controllers 31*a* and 31*b* can be secured. For this reason, the role of "stronghold for securing safety" is not lost.

As described above, in the present embodiment, the detecting device 60 which detects cyber-attacks from outside or inside is installed. Moreover, based on the detection result of the detecting device 60, the functions of the safety controllers 31*a* and 31*b* and the engineering terminal 23 are restricted. For this reason, the cyber-attack to the safety controllers 31*a* and 31 *b* can be prevented beforehand, and the normality of the safety controllers 31*a* and 31*b* can be secured. Further, by setting countermeasures in accordance with threat of the cyber-attack, the cyber-attack can be prevented effectively without shutting down the plant carelessly.

Second Embodiment

Figure 8:
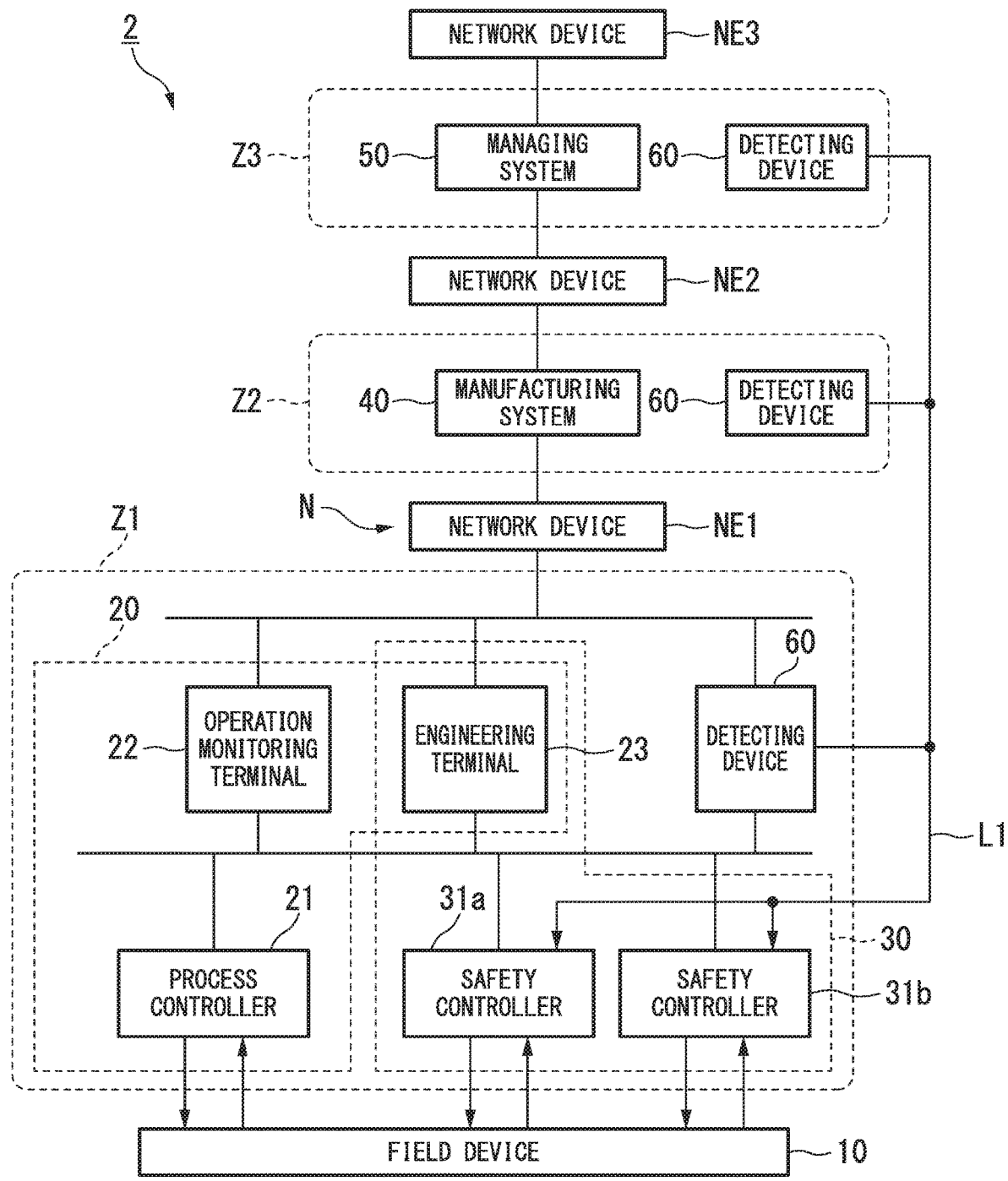
FIG. 8 is a block diagram illustrating a whole configuration of the integrated industrial system in the second embodiment of the present invention.

FIG. 8 is a block diagram illustrating a whole configuration of the integrated industrial system in the second embodiment of the present invention. In FIG. 8, parts that are the same as those in FIG. 1 (or parts that correspond to those in FIG. 1) are assigned the same reference numerals. As shown in FIG. 8, the integrated industrial system 2 of the present embodiment is generally the same configuration as the integrated industrial system 1 shown in FIG. 1. However, the integrated industrial system 2 of the present embodiment is different from the integrated industrial system 1 shown in FIG. 1 in that the detecting device 60 and the safety controllers 31*a* and 31*b* are connected to each other through a communication line L1 (communication line) which is different from the network N.

For example, the communication line L1 is a transmission line for transmitting a contact signal, and a transmission line for transmitting an analog signal. The communication line L1 transmits the detection result detected by the detecting device 60 to the safety controllers 31*a* and 31*b*. The communication line L1 may connect the detecting device 60 and the safety controller 31*a* (or the safety controller 31*b*) by one-to-one, or may connect two or more detectors 60 and the safety controllers 31*a* and 31*b* in a form of network.

In this way, the detecting device 60 and the safety controllers 31*a* and 31*b* are connected by the communication line L1, in order to be able to prevent the cyber-attack from outside or inside more certainly. That is, if a cyber-attack is performed, there is a possibility that communication through the network N becomes impossible. Even if the communication through the network N becomes impossible, in a case that the communication through the communication line L1 is possible, the detection result of the detecting device 60 can be transmitted to the safety controllers 31a and 31b, and the security countermeasures in accordance with the detection result of the detecting device 60 can be performed. For this reason, the cyber-attack from outside or inside can be prevented more certainly.

The integrated industrial system 2 of the present embodiment is the same as the integrated industrial system 1 of the first embodiment, except that the detection result of the detecting device 60 is transmitted to the safety controllers 31a and 31b through the communication line L1. For this reason, since operations of the integrated industrial system 2 of the present embodiment are basically the same as those of the integrated industrial system 1 of the first embodiment, detail explanations will be omitted.

As described above, also in the present embodiment, similar to the first embodiment, the detecting device 60 which detects cyber-attacks from outside or inside is installed. Moreover, based on the detection result of the detecting device 60, the functions of the safety controllers 31a and 31b and the engineering terminal 23 are restricted. For this reason, the cyber-attack to the safety controllers 31a and 31b can be prevented beforehand, and the normality of the safety controllers 31a and 31b can be secured. Further, by setting countermeasures in accordance with threat of the cyber-attack, the cyber-attack can be prevented effectively without shutting down the plant carelessly.

OTHER EMBODIMENTS

Figure 9A:
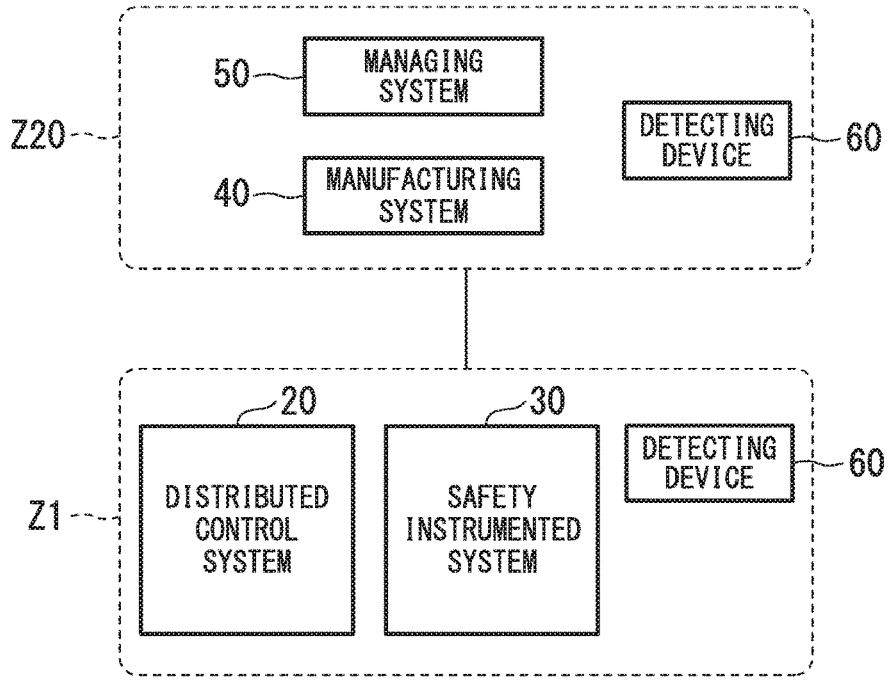
FIG. 9A is a block diagram illustrating an integrated industrial system in another embodiment of the present invention.
Figure 9B:
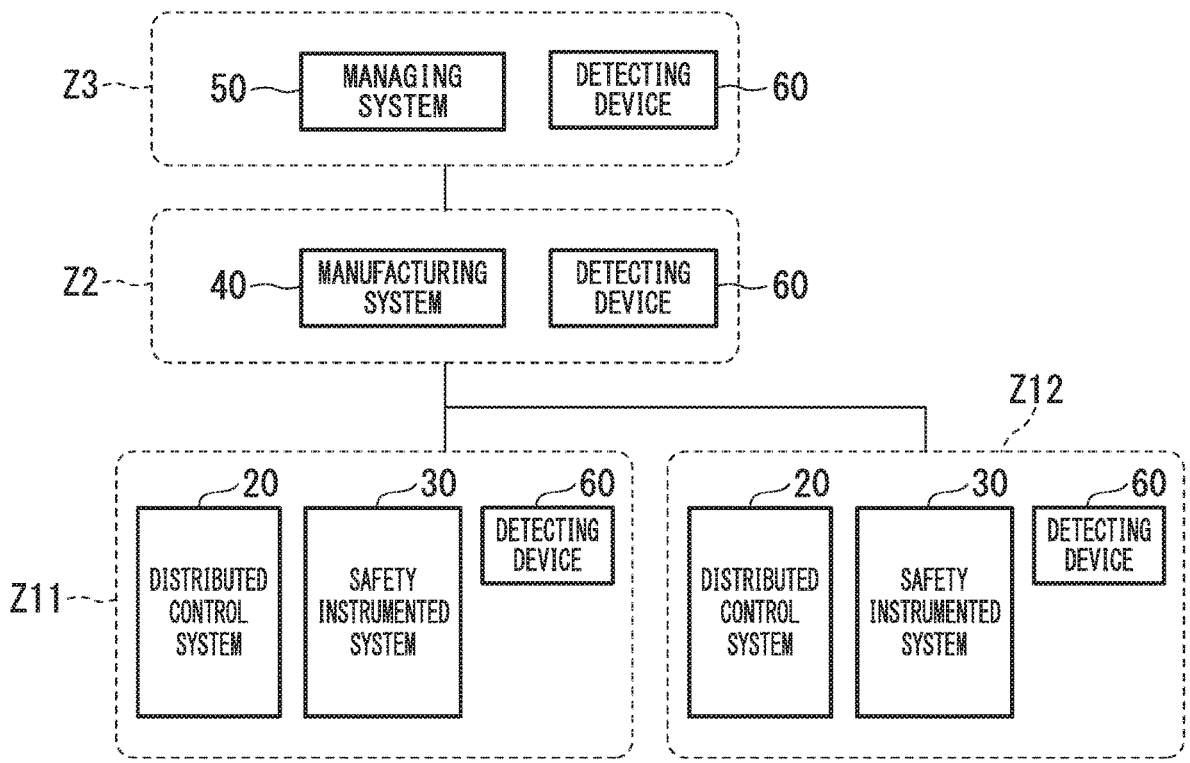
FIG. 9B is a block diagram illustrating an integrated industrial system in another embodiment of the present invention.

FIG. 9A and FIG. 9B are block diagrams illustrating the integrated industrial system in the other embodiments of the present invention. In FIGS. 9A and 9B, parts that are the same as those in FIG. 1 and FIG. 8 (or parts that correspond to those in FIG. 1 and FIG. 8) are assigned the same reference numerals. In FIG. 9A and FIG. 9B, the field device 10 and the network devices NE1 to NE3 are omitted to simplify the illustration.

In the integrated industrial system of the embodiment shown in FIG. 9A, the manufacturing system 40 and the managing system 50 are installed in the same zone Z20, and the detecting device 60 is installed in the zone Z20. Although the integrated industrial systems 1 and 2 of the first and second embodiments are sectioned to the zones Z1 to Z3 on a basis of hierarchy, two or more hierarchies may be installed in one zone as the present embodiment.

The integrated industrial system of the embodiment shown in FIG. 9B is equipped with two or more distributed control systems 20 and two or more safety instrumented systems 30. In the integrated industrial system of this form, the distributed control system 20, the safety instrumented system 30, and the detecting device 60 are installed in each of zones Z11 and Z12. In the integrated industrial system shown in FIG. 9B, for example, the detection results of the detecting devices 60 installed in the zone Z2 and the zone Z3 are respectively input to safety controllers (not illustrated) of the safety instrumented systems 30 installed in the zone Z11 and the zone Z12. The detection result of the detecting device 60 installed in the zone Z11 is input to a safety controller (not illustrated) of the safety instrumented system 30 installed in the zone Z11. The detection result of the detecting device 60 installed in the zone Z12 is input to a safety controller (not illustrated) of the safety instrumented system 30 installed in the zone Z12.

Although an integrated industrial system according to embodiments of the present invention has been described above, the present invention is not restricted to the above-described embodiments, and can be freely modified within the scope thereof. For example, the foregoing descriptions of the embodiments have been examples in which the integrated industrial system is sectioned to the zones Z1 to Z3 on a basis of hierarchy specified by International Standard ISA-95 (IEC/ISO 62264), in order to secure security. However, it is not necessary for the integrated industrial system to be configured in conformity with the standard. As shown in the examples of FIG. 9A and FIG. 9B, a zone for security countermeasures can be set arbitrarily, and a zone in which a configuration included in the integrated industrial system is installed can be set arbitrarily.

In the embodiment described above, in order to understand easily, an example of defending the cyber-attack to the safety controllers 31a and 31b has been described. However, in addition to the safety instrumented system 30, security countermeasures may be performed in consideration of an influence on the distributed control system 20. In a case that such a countermeasure is performed, the same configuration as the defense unit DF, which has been installed in the safety controllers 31a and 31b of the safety instrumented system 30, is installed in the process controller 21 of the distributed control system 20. Moreover, the detection result of the detecting device 60 is also input to the process controller 21. If a cyber-attack is performed, the process controller 21 performs a countermeasure of restricting at least one of functions.

As described by using FIG. 3 and FIG. 5, the contents of the setting list LS can be set arbitrarily. However, for example, it is desirable that the nearer the zone Z to which the safety instrumented system 30 playing a role of "stronghold for securing safety" belongs, the higher a level of countermeasure is. If the setting has been made, the cyber-attack can be prevented effectively without shutting down the plant carelessly.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention.

Accordingly, the present invention is not to be considered as being limited by the foregoing description, and is only limited by the scope of the claims.

What is claimed is:

1. A safety controller of an integrated industrial system which is established in a plant, the safety controller comprising:
    a processor; and
    a memory,
    wherein the safety controller is installed in a safety instrumented system which stops the integrated industrial system in a safe state if an abnormality has occurred in the integrated industrial system,
    wherein a process controller which collects measurement data from a field device installed in the plant and controls the field device is installed in a distributed control system which controls industrial process implemented in the plant,
    wherein an engineering terminal used for creating programs to be executed by the safety controller is installed in the distributed control system and the safety instrumented system, and
    wherein the processor executes a program stored in the memory to perform operations comprising:
    performing a countermeasure of restricting at least a part of functions of the safety controller, based on a detection result obtained by detecting a cyber-attack from at least one of inside and outside to the integrated industrial system;
    in a case where the detection result indicates that the cyber-attack against the safety controller and the process controller is detected, in the engineering terminal and the safety controller, prohibiting a change of application programs and discarding a control command input from outside; and
    in a case where the detection result indicates that the cyber-attack to the engineering terminal is detected, stopping all communication functions of the engineering terminal and the safety controller.

2. The safety controller according to claim 1,
    wherein the processor is further configured to:
    specify a target and a type of the cyber-attack based on the detection result, set the countermeasure in accordance with the target and the type which have been specified; and
    execute the countermeasure which has been set by the setter.

3. The safety controller according to claim 2,
    wherein the processor is further configured to:
    set the countermeasure by using a setting list in which the target and the type of the cyber-attack are associated with the countermeasure which should be performed in accordance with the target and the type of the cyber-attack.

4. The safety controller according to claim 1,
    wherein the engineering terminal with which an operator makes a program executed on the safety controller is provided in a safety instrumented system,
    the processor is further configured to perform, according to a setting list, a countermeasure of stopping all communication functions of the engineering terminal and the safety controller in a case where the detection result indicates that the cyber-attack against the engineering terminal is detected.

5. An integrated industrial system comprising:
    a safety instrumented system which is connected to a network; and
    a detector configured to detect a cyber-attack from at least one of inside and outside to the integrated industrial system,
    wherein the safety instrumented system comprises a safety controller,
    the safety controller comprises:
    a processor; and
    a memory,
    wherein the safety controller is installed in the safety instrumented system which stops the integrated industrial system in a safe state if an abnormality has occurred in the integrated industrial system,
    wherein a process controller which collects measurement data from a field device installed in the plant and controls the field device is installed in a distributed control system which controls industrial process implemented in the plant,
    wherein an engineering terminal used for creating programs to be executed by the safety controller is installed in the distributed control system and the safety instrumented system, and
    wherein the processor executes a program stored in the memory to perform operations comprising:
    performing a countermeasure of restricting at least a part of functions of the safety controller, based on a detection result obtained with a detector that detects a cyber-attack from at least one of inside and outside to the integrated industrial system;
    in a case where the detection result indicates that the cyber-attack against the safety controller and the process controller is detected, in the engineering terminal and the safety controller, prohibiting a change of application programs and discarding a control command input from outside; and
    in a case where the detection result indicates that the cyber-attack to the engineering terminal is detected, stopping all communication functions of the engineering terminal and the safety controller.

6. The integrated industrial system according to claim 5,
    wherein the integrated industrial system comprises a first zone and a second zone,
    the detector comprises a first detector installed in the first zone and a second detector installed in the second zone,
    the first detector is configured to detect the cyber-attack from at least one of inside and outside to the first zone, and
    the second detector is configured to detect the cyber-attack from at least one of inside and outside to the second zone.

7. The integrated industrial system according to claim 5,
    wherein the defender of the safety controller is configured to obtain a detection result of the detector through the network.

8. The integrated industrial system according to claim 5,
    wherein the processor is further configured to obtain a detection result of the detector through a communication line which is different from the network.

9. The integrated industrial system according to claim 6,
    wherein the engineering terminal with which an operator makes a program executed on the safety controller is provided in the safety instrumented system,
    the processor is further configured to perform, according to a setting list, a countermeasure of stopping all communication functions of the engineering terminal and the safety controller in a case where the detection result indicates that the cyber-attack against the engineering terminal is detected.

10. The integrated industrial system according to claim 9, wherein the safety instrumented system is installed in the first zone, the integrated industrial system further comprising:
a distributed control system which is installed in the first zone, the distributed control system being configured to control industrial process implemented in a plant; and
a host system which is installed in the second zone.

11. The integrated industrial system according to claim 10, wherein the host system is a first system which includes at least one of a manufacturing execution system, a plant information management system, and a plant asset management system.

12. The integrated industrial system according to claim 11, further comprising:
a second system which is installed in a third zone which is different from the second zone in which the first system is installed, the second system comprising an enterprise resource planning system.

13. A control method of an integrated industrial system which comprises a safety instrumented system comprising a safety controller installed in the safety instrumented system which stops the integrated industrial system in a safe state if an abnormality has occurred in the integrated industrial system, a process controller which collects measurement data from a field device installed in a plant and controls the field device being installed in a distributed control system which controls industrial process implemented in the plant, and an engineering terminal used for creating programs to be executed by the safety controller being installed in the distributed control system and the safety instrumented system, the control method comprising:

detecting a cyber-attack from at least one of inside and outside to the integrated industrial system;
performing a countermeasure of restricting at least a part of functions of the based on a detection result of the cyber-attack;
in a case where the detection result indicates that the cyber-attack against the safety controller and the process controller is detected, in the engineering terminal and the safety controller, prohibiting a change of application programs and discarding a control command input from outside; and in a case where the detection result indicates that the cyber-attack to the engineering terminal is detected, stopping all communication functions of the engineering terminal and the safety controller.

14. The control method according to claim 13, further comprising:
specifying a target and a type of the cyber-attack based on the detection result of the cyber-attack;
setting the countermeasure in accordance with the target and the type which have been specified; and
executing the countermeasure which has been set.

15. The control method according to claim 14, further comprising:
setting the countermeasure by using a setting list in which the target and the type of the cyber-attack are associated with the countermeasure which should be performed in accordance with the target and the type of the cyber-attack.

16. The control method according to claim 13,
wherein the integrated industrial system comprises a first zone in which a first detector is installed and a second zone in which a second detector is installed
wherein the control method further comprises:
detecting, by at least one of the first detector and the second detector, the cyber-attack from at least one of inside and outside to at least one of the first zone and the second zone.

17. The control method according to claim 16, further comprising:
obtaining the detection result of at least one of the first detector and the second detector through the network.

18. The control method according to claim 16, further comprising:
obtaining the detection result of at least one of the first detector and the second detector through a communication line which is different from the network.

19. The control method according to claim 16,
wherein a distributed control system is installed in the first zone,
wherein the safety instrumented system is installed in the first zone,
wherein the distributed control system is configured to control industrial process implemented in a plant, and
wherein a host system is installed in the second zone.

* * * * *